R. A. GREEN.
ANIMAL TRAP.
APPLICATION FILED JAN. 22, 1913.
1,143,698.
Patented June 22, 1915.
2 SHEETS—SHEET 1.
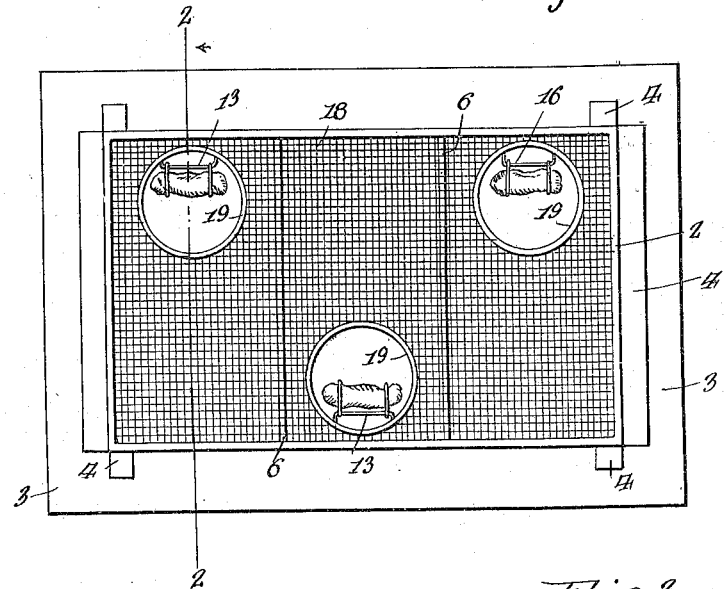
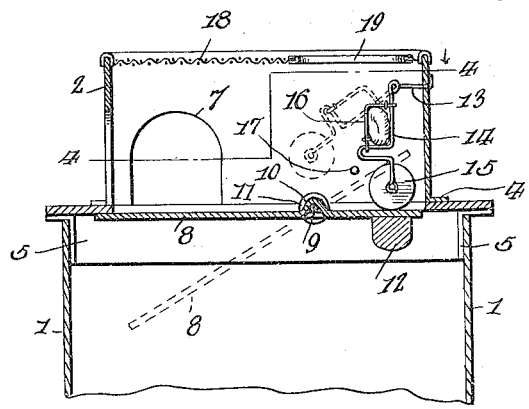
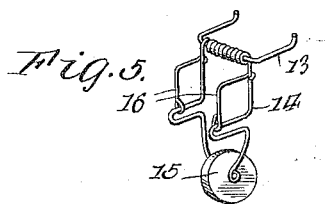
WITNESSES
INVENTOR

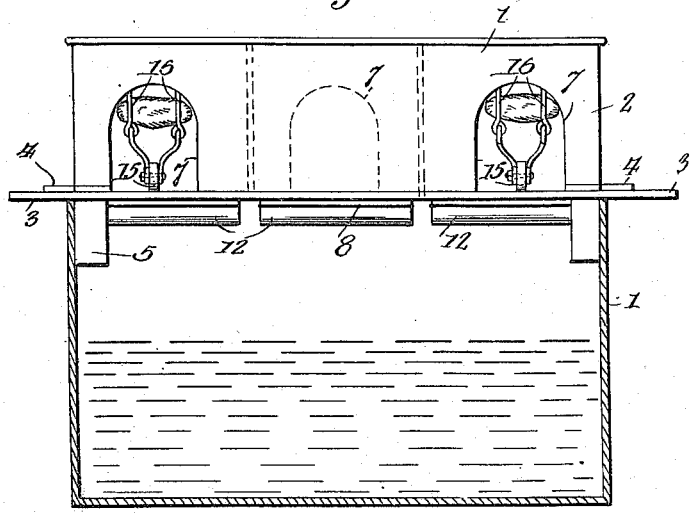
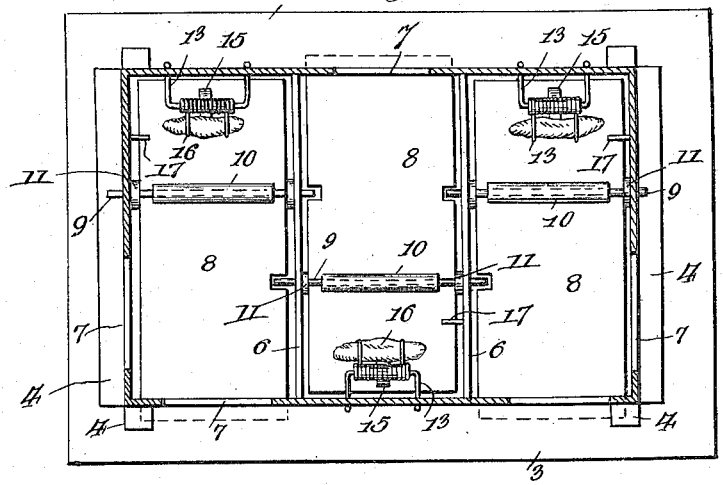

UNITED STATES PATENT OFFICE.

ROBERT A. GREEN, OF QUAPAW, OKLAHOMA.

ANIMAL-TRAP.

1,143,698.  Specification of Letters Patent.  Patented June 22, 1915.

Application filed January 22, 1913. Serial No. 743,675.

*To all whom it may concern:*

Be it known that I, ROBERT A. GREEN, a citizen of the United States, residing at Quapaw, in the county of Ottawa and State of Oklahoma, have invented new and useful Improvements in Animal-Traps, of which the following is a specification.

This invention relates to the class of animal traps.

The primary object of the invention is to provide a trap simple in construction, yet dependable and reliable in operation, the animal being entrapped in such a manner as to render his escape impossible.

Another object of the invention is to provide an animal trap wherein the animal when caught or entrapped is in no way injured, thereby producing a trap capable of advantageous use in connection with the hunting or capture of wild fur bearing animals.

A further object of the invention is to provide a device of this character wherein any number of animals may be entrapped and caught at one and the same time, according to the number of compartments provided in connection with the trap.

With the above and various other objects in view the invention consists essentially in the provision of an underground receptacle or tank, upon the top of which is disposed a plurality of trap compartments, each being provided with a specially devised trap door leading into the tank, and a bait carrying trigger whereby an animal on attempting to dislodge the bait from the trigger will cause the door to automatically operate and the animal to fall within the tank wherein he is held until purposely removed.

Certain other features of construction together with the combination and arrangement of the several parts as will be hereinafter fully described and specifically pointed out in the appended claim must be reasonably considered in determining the advantages and novel features of this invention.

In describing my invention in detail reference will be had to the accompanying drawings wherein like characters denote like or corresponding parts throughout the several views, and in which:—

Figure 1 is a top plan view of the trap. Fig. 2 is a section on line 2—2 of Fig. 1. Fig. 3 is an elevation of the trap, the tank being shown in section. Fig. 4 is a section on line 4—4 of Fig. 2, and Fig. 5 is a detail perspective view of the trigger.

Referring now more particularly to the drawings wherein is illustrated the preferred form of my invention the numeral 1 designates a suitable tank, open at the top, and preferably composed of tin or other sheet metal material incapable of being gnawed by the teeth or claws of an animal, the size of the tank depending upon the number of trap compartments employed in connection with my invention.

A trap frame 2 having a runway or base plate 3 secured thereto through the medium of a plurality of flanges 4 formed integral with the frame, is detachably mounted upon the top of the tank 1, where it is held in place by means of a plurality of depending angled plates 5 secured to the under face of the runway 3 and depending within the tank in such a manner as to prevent lateral movement of the frame, yet permit its entire removal should occasion demand by simply raising the same until the plates 5 have cleared the edges of the said tank.

Any number of partition walls 6 may be disposed within the trap frame 1 according to the number of compartments desired, each compartment being in communication with the exterior of the trap by reason of the openings or passages 7 provided in the frame sides.

Trap doors 8, one for each compartment are pivotally mounted within the frame through the medium of a plurality of parallel rods 9 extending through offset portions 10 on the door, and provided with flanges 11 to prevent lateral movement of either the rods or the door. The door is eccentrically mounted, the greater portion thereof extending toward the opening 7 in the frame sides and underlapping the runway 3 to normally hold the same below its level, as the smaller portion thereof is weighted as at 12 upon its under side which more than counterbalances the greater portion of the door and holds the same in proper position.

Triggers are employed for the purpose of supporting and preventing pivotal movement of the doors 8, one trigger for each compartment or door, and each comprising a U-shaped wire bracket 13 secured to the frame sides upon the interior thereof, upon which is loosely mounted a specially formed one piece wire trigger arm 14, the latter supporting a roller 15 which normally engages the smaller portion of the door 8, this construction holding the door immovable until actuation of the trigger has taken place. A bait securing member 16 is attached to each arm 14 in such a manner as to render accidental removal of the bait impossible.

The animal upon entering the trap through one of the openings or passages 7 stands upon the trap door 8, the trigger preventing pivotal movement of the latter. In attempting to remove the bait from the trigger, the latter is rolled or swung forward as indicated by the dotted lines in Fig. 2 until the weight of the animal causes the forward or greater portion of the door to drop, in which event the animal being unable to retain his footing is cast or dropped into the tank or receptacle where escape is impossible and death ultimately certain as the tank is partially filled with water to effect a drowning of the animal entrapped. A stop lug 17 projects from one side of each compartment to limit the movement of the door during its operation, thus it will be seen that the weight 12 after the animal has fallen from the trap door will cause the same again to resume its normal position ready to entrap another animal.

The top of the frame 2 is covered with wire mesh 18, provided with openings 19 over each trigger to permit the fastening of the bait thereupon the mesh being provided to admit light into the interior of the trap and to allow the odor arising from the bait to freely escape.

It will be seen from the above taken in connection with the accompanying drawings that the trap doors alternate, that is, the entrance of one compartment is in communication with the exterior of the trap upon one side thereof while that of the next or adjacent compartment is in communication with the exterior upon the opposite side of the trap, this construction allowing an entrance into the trap from either side thereof; that the animal is in no way injured during the operation of the trap thus permitting its use in the capture of wild fur bearing animals; and that the novel and peculiar construction of the trigger arm renders the trap inoperative unless the said arm has been pulled forward as previously described.

Attention is also called to the fact that a roller provided upon the lower extremity of the trigger arm when once started will cause the latter to continue in the forward direction thus permitting complete operation of the trap; that the tank may be left empty to facilitate the capture of live wild animals; and that the angle plates secured upon the under face of the runway permit vertical movement of the frame at all times yet preventing lateral movement thereof at any time.

It is thought from the foregoing that the advantages and novel features of my device will be fully appreciated.

I desire it to be understood that I may make slight changes in the construction and in the arrangement and combination of the several parts, provided such changes fall within the scope of the subjoined claim.

Having thus fully described my invention, what I claim as new and desire to secure by Letters Patent, is:—

In an animal trap, a pivoted trap door, a bait support, a housing within which the said bait support is arranged, a bracket from which the said bait support is suspended, said bait support being constructed of a single strand of wire bent to form bearings at its respective terminals, the said wire being bent equi-distant its ends to form a coil through which the said supporting bracket extends, a roller carried by the said support, said roller being journaled between the respective bearings and engageable directly with the trap door, the roller being movable longitudinally relatively to the door upon an attempted dislodgment of the bait, and means attaching the bait to the said support directly above the roller, the weight of the roller and the bait serving to return the door to its normal position after the trap has been sprung, as and for the purpose set forth.

ROBERT A. GREEN.

Witnesses:
W. I. J. BRIGHAM,
A. W. GREGORY.